United States Patent [19]

Gerritsen et al.

[11] 3,803,444

[45] Apr. 9, 1974

[54] TELEVISION DISPLAY APPARATUS EMPLOYING CONVERGENCE CORRECTION

[75] Inventors: Jam Gerritsen; Leonaidus Albertus Antonius Valkestijn, both of Emmasingel, Eindhoven, Netherlands

[73] Assignee: U. S. Philips Corporation, New York, N.Y.

[22] Filed: Apr. 27, 1972

[21] Appl. No.: 248,091

[30] Foreign Application Priority Data

May 12, 1971 Netherlands ........................ 7106492
July 3, 1971 Netherlands ........................ 7109223
Oct. 2, 1971 Netherlands ........................ 7113563

[52] U.S. Cl. ........................... 315/13 C, 315/27 GD
[51] Int. Cl. ............................................. H01j 29/50
[58] Field of Search ............ 315/13 C, 27 R, 27 TD, 315/27 GD

[56] References Cited

UNITED STATES PATENTS 3,444,422 5/1969 Wolber ........................ 315/27 SR X
3,714,500 1/1973 Kaashoek .................. 315/27 GD X
3,423,631 1/1969 Geller et al. ....................... 315/27 R
3,444,426 5/1969 Buechel ........................... 315/27 TD
3,648,099 3/1972 Otten et al. ..................... 315/27 GD
3,676,733 7/1972 Eulenberg et al. ............. 315/27 GD

*Primary Examiner*—Carl D. Quarforth
*Assistant Examiner*—P. A. Nelson
*Attorney, Agent, or Firm*—Frank R. Trifari; Henry I. Steckler

[57] ABSTRACT

Colour television display apparatus using substantially non-anisotropic astigmatic deflection coils resulting in the convergence along the axes and in the corners of the display screen being satisfactory. A residual convergence error may, however, be produced elsewhere on the screen, which error is eliminated by a difference current which is generated by the raster correction circuit and which flows through the deflection coil halves. In one embodiment this current is derived from a resistor in the North-South raster correction circuit. A second correction current which has the double line frequency provides a further improvement. One of the coil halves may be shunted by a VDR.

12 Claims, 17 Drawing Figures

TELEVISION DISPLAY APPARATUS EMPLOYING CONVERGENCE CORRECTION

The invention relates to television display apparatus including a colour television display tube, line and field deflection current generators for applying sawtooth-shaped deflection currents of line and field frequency having a substantially constant peak-to-peak amplitude to a line and field deflection coil, a raster correction circuit for correcting the geometrical properties of the image displayed and a convergence circuit for registering the landing spots of the electron beams on the screen of the television display tube, at least one deflection coil being divided into two substantially equal coil halves.

The publication "Philips Product Information 13 : 110° Colour Television Picture Tube and Deflection Principle" of May 2, 1969 describes a colour television display tube having a deflection angle of 110° and the associated deflection unit. In this case anisotropic astigmatic deflection coils are chosen which make it possible for the electron beams to be satisfactorily converged without serious colour purity errors along the axes of the screen, but large convergence errors remain elsewhere and particularly in the corners, which errors cannot be eliminated by the convergence circuit. The said publication states that these errors can be corrected if a quadripolar field is generated by the deflection coils, which field is superimposed on the deflection fields. Such a quadripolar field may be obtained by passing an additional current through the deflection coil halves and this in opposite directions, which current — the so-called difference current — must be approximately proportional to the product of the instantaneous values of the two deflection currents. The generator generating the difference current must therefore receive and process information from the two deflection generators. Moreover it may be desirable to adjust the four corners separately. Various steps have been proposed for this purpose which have led to more or less intricate circuits.

For these reasons it has become desirable to use a deflection system which, as in the case of tubes having a deflection angle of 90°, is not or is at most slightly anisotropic astigmatic so that the above-mentioned difference current generator can be omitted. When convergence is performed along the axes of the display screen, the convergence in the corners is automatically correct. When using deflection coils of this kind employing 110° tubes it has, however, been found that a remaining convergence error is left, namely an error at which in areas other than those along the axes and in the corners of the screen the green and red landing spots are shifted vertically and the blue landing spots are shifted horizontally. This error cannot be eliminated with known convergence means.

The invention is based on the recognition of the fact that this error can also be corrected by using a quadripolar field, but without a separate difference current generator being required and to this end the television display apparatus according to the invention is characterized in that for correcting residual convergence errors which occur at areas other than along the axes and in the corners of the displayed image, while using deflection coil halves substantially without anisotropic astigmatism, the raster correction circuit also includes a current source which generates a substantially sinusoidal convergence correction current of line frequency flowing through the deflection coil halves with an amplitude varying at the field frequency which is dependent on the instantaneous intensity of the field deflection current, said correction current in one coil half flowing in the same direction and in the other coil half flowing in a direction opposite to that of the deflection current.

Due to the step according to the invention the raster correction circuit which is present in the display apparatus anyway has an additional function, namely the generation of an additional convergence correction current.

The convergence correction is still further improved because the raster correction circuit also includes a current source which generates a substantially sinusoidal second convergence correction current flowing through the deflection coil halves at the double line frequency and with a field frequency varying amplitude which is dependent on the instantaneous value of the field deflection current, said second correction current in one coil half flowing in the same direction and in the other coil half flowing in the direction opposite to that of the deflection current and being added to the first correction current.

As a result the use of "90°-like" deflection coils can also very simply be realized. One embodiment of the television display apparatus according to the invention in which the raster correction circuit includes a circuit for the North-South pincushion correction which circuit is arranged in series with the field deflection coil halves which are connected to earth at the other end and in which a virtual earth point is brought about on said North-South correction circuit is characterized in that an impedance network is arranged between earth and a point on the North-South correction circuit deviating from the virtual earth point.

It may be noted that the above-mentioned error also occurs in 90° tubes, although to a lesser degree, so that the necessity to correct it becomes only necessary for 110° tubes. It will be evident that the step according to the invention may alternatively be used for 90° tubes.

In order that the invention may be readily carried into effect, some embodiments thereof will now be described in detail by way of example with reference to the accompanying diagrammatic drawings in which FIG. 1 shows a block diagram of part of a known television display apparatus;

Figure 5:
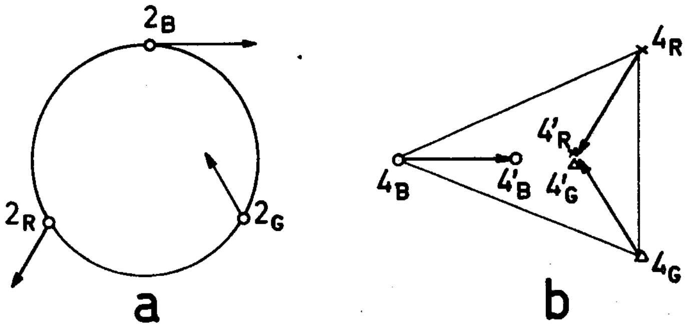
Figure 6:
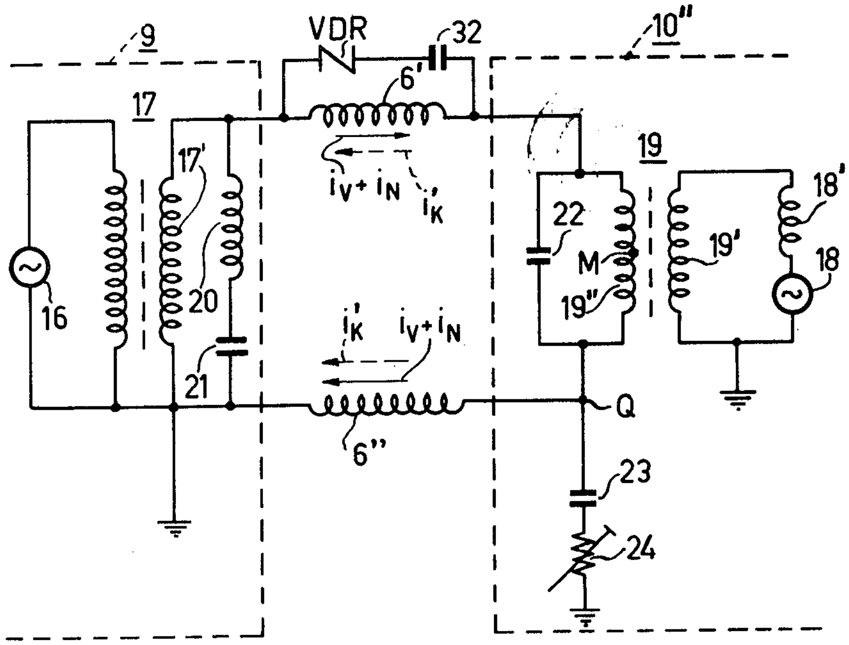
Figure 7:
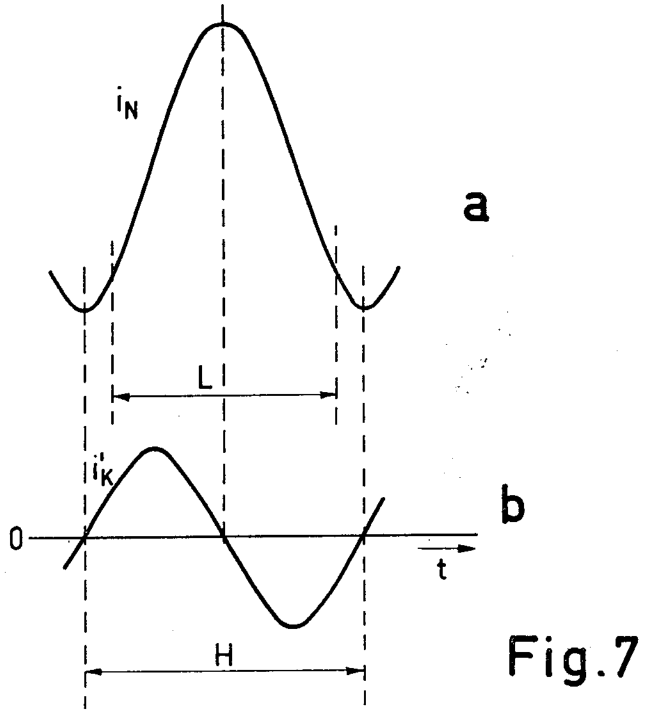
Figure 8:
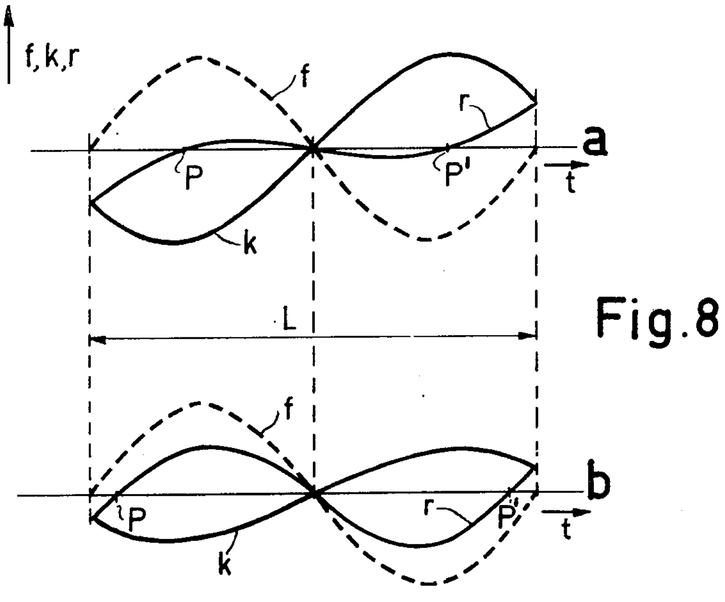
Figure 9:
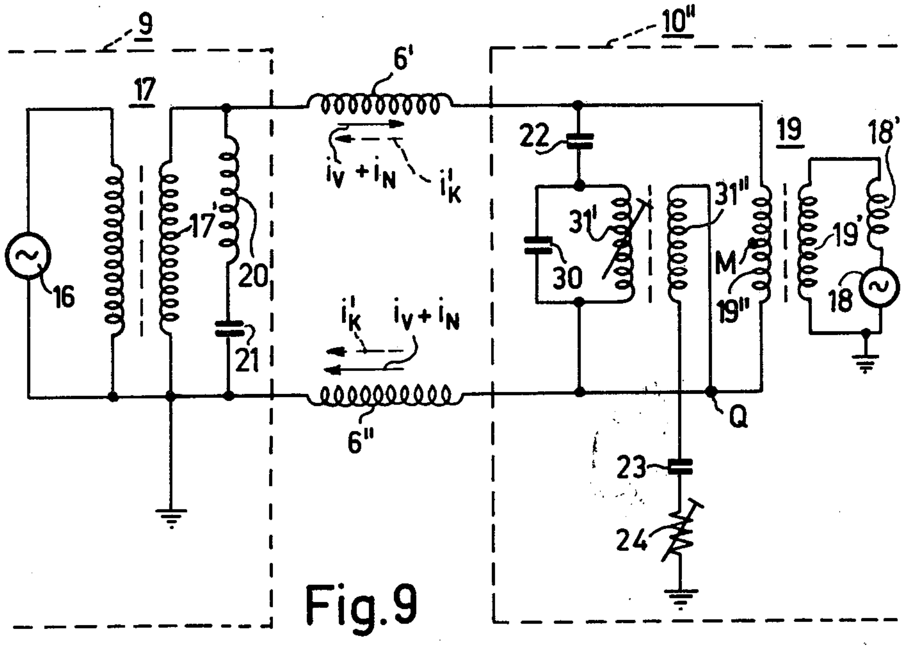
Figure 11:
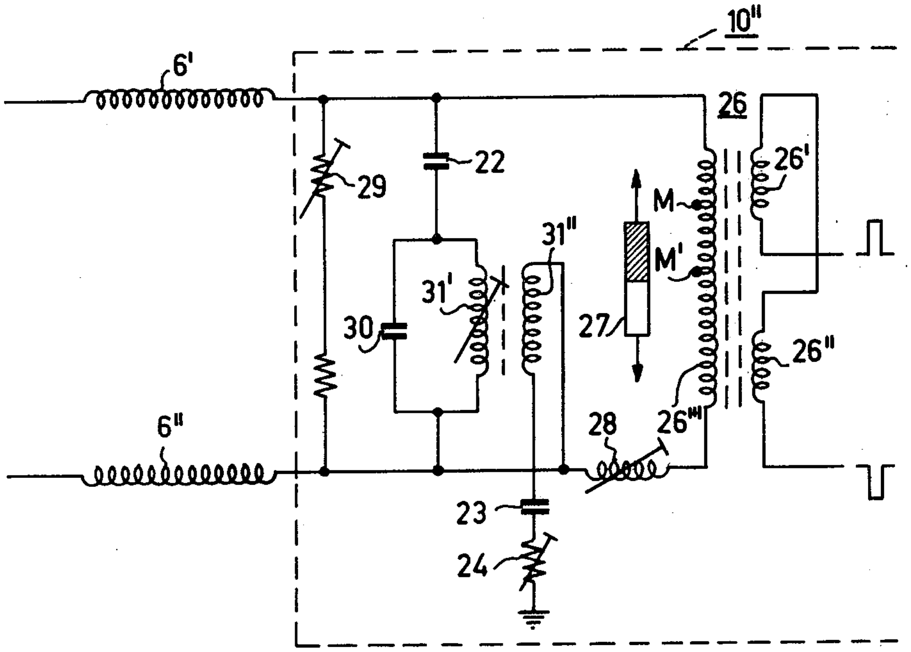
Figure 10:
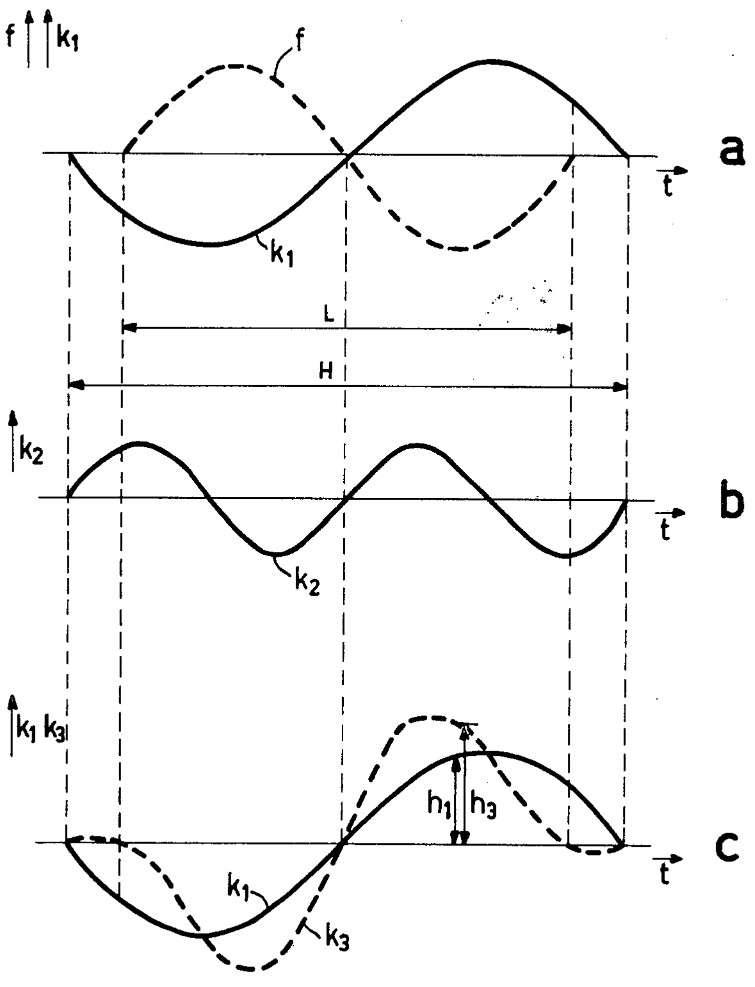
Figure 12:
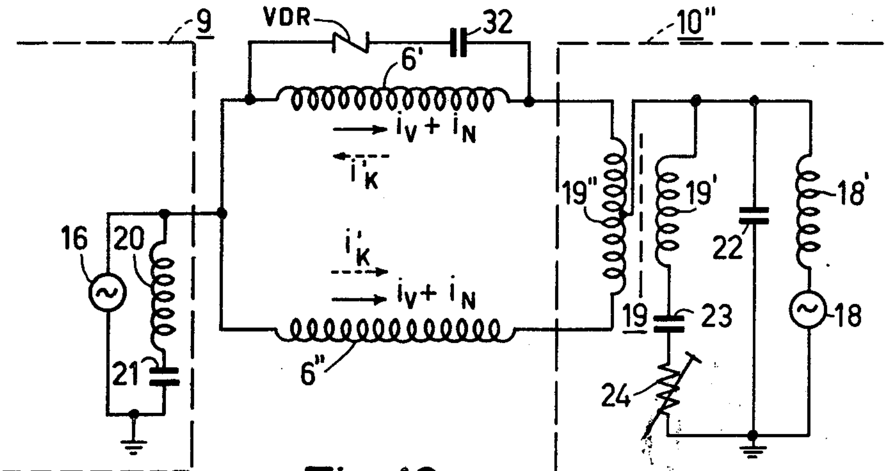
Figures 13, 14, 15, 16:
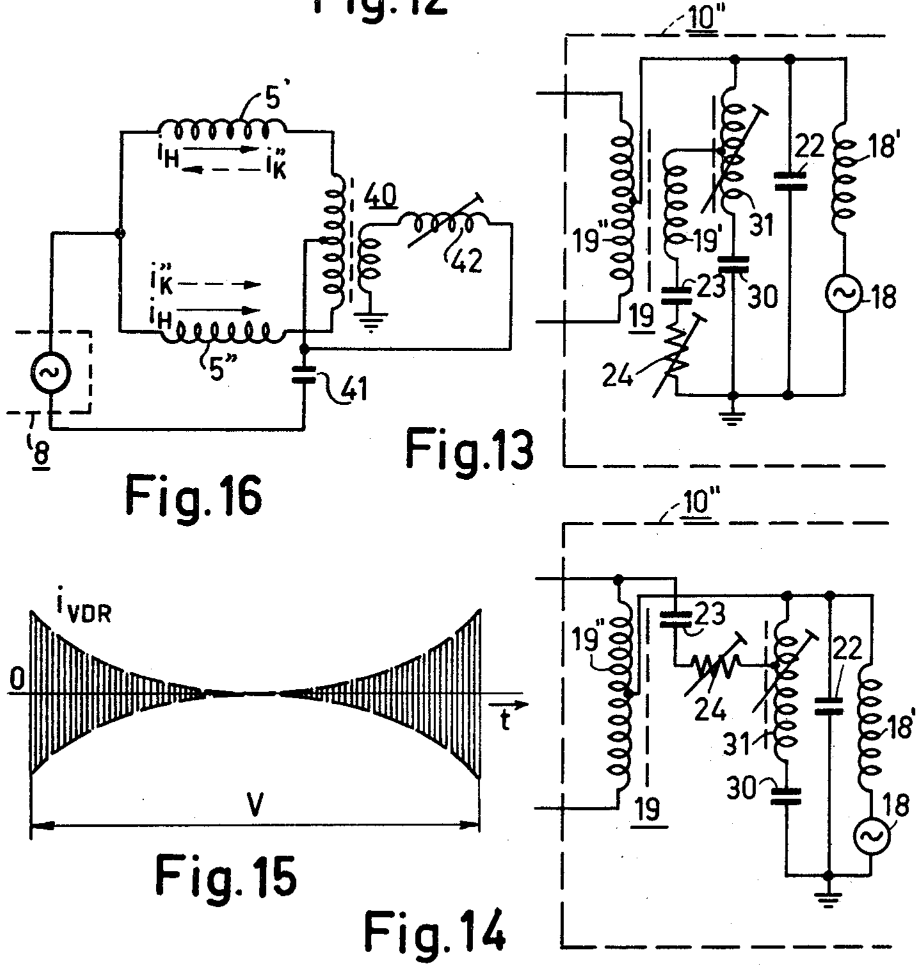

FIGS. 5*a* and *b* show the resultant correction;

FIG. 6 shows a further embodiment according to the invention;

FIGS. 7 and 8 show waveforms which then occur;

FIG. 9 shows a further embodiment according to the invention;

FIG. 10 shows waveforms which occur in the embodiment according to FIG. 9,

FIGS. 11, 12, 13, 14 and 16 show further embodiments according to the invention and, FIG. 15 shows the variation of a current in an embodiment according to the invention.

Figure 1:
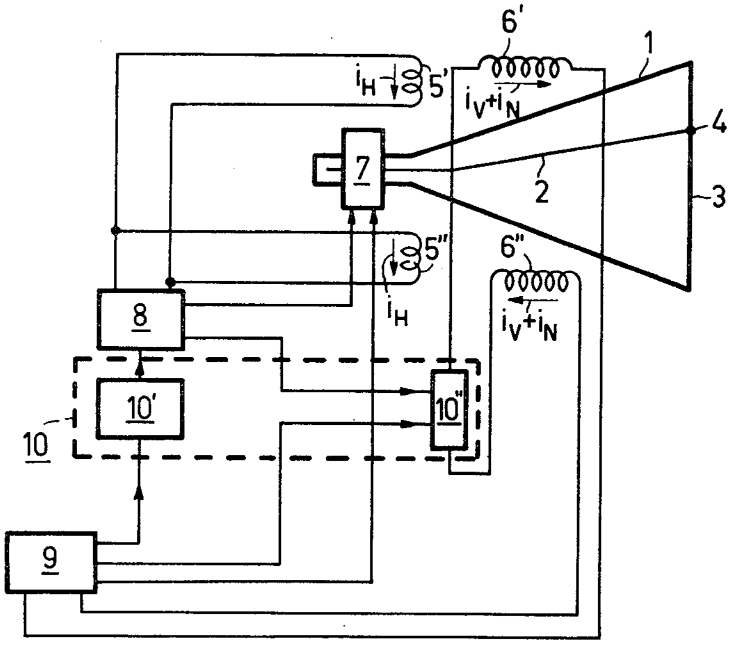

FIG. 1 shows a simplified block diagram of part of a colour television display apparatus, for example, a colour television receiver in which the television tube 1 is of the shadow mask type. Three electron guns not shown generate three electron beams one of which, beam 2, is shown and impinges upon the display screen 3 of luminescent material at a point 4 after it has been deflected by the magnetic fields which are generated by the deflection coils 5 for the horizontal deflection and 6 for the vertical deflection. Both coils are divided into substantially equal coil halves 5' and 5'' and 6' and 6''. A convergence circuit 7 ensures that the three beams coincide in one landing spot.

A line-frequency time base 8 includes a deflection current generator which provides the line deflection current $i_H$ for the coil halves 5' and 5'' which in this embodiment are arranged in parallel. Time base 8 also supplies a signal to a convergence circuit 7 for the purpose of the dynamic line frequency convergence. In a corresponding manner a field frequency time base 9 includes a deflection current generator which provides the field deflection current $i_V$ for the coil halves 6' and 6'' which in this example are arranged in series. Time base 9 also supplies a signal to convergence circuit 7 for the purpose of the dynamic field frequency convergence. Circuit 7 also includes known means for the static convergence, i.e. for the convergence in the centre of screen 3.

Furthermore the arrangement includes a raster correction circuit 10 for correcting the geometrical properties of the displayed image. As is known the horizontal deflection is to be influenced in such a manner that the line deflection current $i_H$ is modulated in amplitude by a field frequency information, while the envelope must be substantially parabolic if the distortion to be corrected is pincushion shaped. This is effected by means of the so-called East West correction circuit 10'. Another raster correction is the so-called North-South correction (in the vertical direction) which is performed by means of a North-South correction circuit 10''. Circuit 10'' generates a line frequency correction current $i_N$ at a field frequency amplitude modulation, the line frequency variation being substantially parabolic in case of pincushion distortion while the envelope decreases from a maximum value in a more or less linear manner to zero during a field scan period in the middle of this period, whereafter a substantially equal increase in the reverse direction follows. Circuit 10'' therefore receives information from both time base 8 and time base 9 and the current $i_N$ generated thereby is superimposed on the field deflection current $i_V$. In FIG. 1 circuit 10'' is arranged in series with deflection coil halves 6' and 6''.

Figure 2:
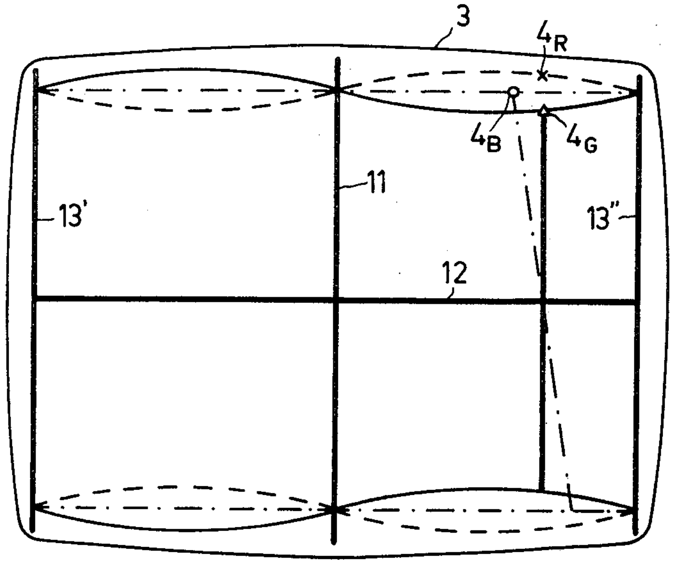
FIG. 2 shows the error to be corrected.

FIG. 2 is a simplified view of the image displayed on screen 3 of display tube 1 when the image to be displayed consists of horizontal and vertical straight lines, the system of coils 5', 5'', 6', 6'' having substantially no anisotropic astigmatism, this image being obtained after the static and dynamic adjusting members in convergence circuit 7 have already been adjusted. It is found that the three electron beams can be registered both along the vertical symmetry axis 11 and along the horizontal symmetry axis 12 and along the sides 13' and 13'' in a satisfactory manner and with few landing errors, that is to say, few colour purity errors. Elsewhere on screen 3 an error is still found to occur which is admissible when tube 1 has a deflection angle of 90°, but this error assumes larger proportions in case of 110° so that a correction is required if the said system of coils is to be used.

The reference numerals $4_R$, $4_G$ and $4_B$ denote the three landing spots associated with one and the same point to be displayed of the three electron beams in the first quadrant, that is to say, to the right of axis 11 and above axis 12, the error being greatly exaggerated for the sake of clarity. It is found that the red landing spot $4_R$ is shifted vertically and upwards, the green landing spot $4_G$ is shifted vertically and downwards and the blue landing spot $4_B$ is shifted horizontally and to the left. The shifts in the other quadrants are such that the shift for each landing spot changes its sign when passing axis 11 or axis 12. A horizontal line in the upper part of the image is therefore displayed as follows: a substantially undistorted horizontal blue line is produced, a red line undulating about this line which appears to the right of axis 11 above this line and to the left thereof below this line and an undulating green line is produced which has a variation which is opposite to that of this red line, the three lines intersecting on axis 11 and on the sides. The largest deviation occurs approximately in the middle between axis 11 and side 13'' and is 1 to 2 mm in 110° tubes. The vertical line which passes through the same landing spot 4 is shown as a substantially undistorted yellow vertical line between landing spot $4_G$ and the symmetrical point thereof relative to axis 12 and an oblique substantially straight blue line which intersects the yellow line on axis 12.

The error described hereinbefore is largest along the upper and lower edges of screen 3 and becomes smaller as axis 12 is approached. A correction of this error is not very well possible with the aid of the known convergence means 7 because the dynamic convergence currents must be modulated, that is to say, the line frequency convergence current would have to undergo a field frequency variation and/or the field frequency convergence current which have to undergo a line frequency variation. In addition the shift for the red and green beams is vertical while these beams can only be influenced radially i.e. at an angle of 60° relative to the vertical. All this would be very complicated.

Figure 3:
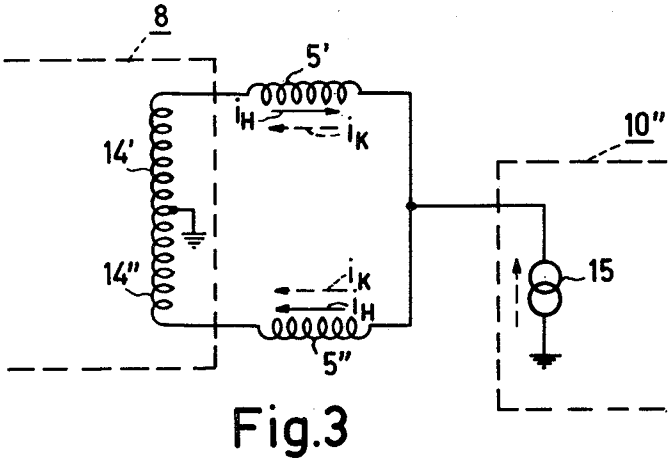
FIG. 3 shows a circuit diagram of an embodiment according to the invention.

The invention is based on the recognition of the fact that a correction can in principle be achieved by means of a difference current drive. This may be evident from FIGS. 3, 4 and 5. In FIG. 3, which is greatly simplified, two substantially equal windings 14' and 14'' whose junction is connected to earth form part of a line deflection current generator associated with time base 8. Windings 14' and 14'' pass line deflection current $i_H$ through the coil halves 5' and 5'' which in this case are arranged in series for the horizontal deflection. A current source 15 is connected to the junction of coil halves 5' and 5'' to which junction a correction current generated by source 15 is applied. Since the circuit in FIG. 3 is symmetrical two substantially identical correction currents flow through coil halves 5' and 5'' which currents are both denoted by $i_K$. The junction of coil halves 5' and 5'' is a virtual earth point for generators 14' 14'' so that this generator and source 15 do not influence each other. It is found from FIG. 3 that currents $i_H$ and $i_K$ in one coil half are added together while they are subtracted from each other in the other coil half.

Figure 4:
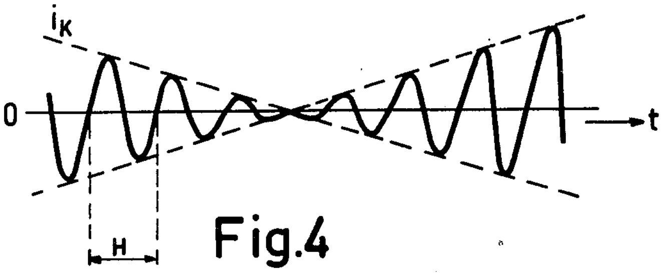
FIG. 4 shows a waveform which then occurs.

Correction current $i_K$ has, as a function of time, a variation which is shown in FIG. 4 for some lines on either side of the central horizontal line i.e. a substantially sinusoidal function of line frequency, having a field-frequency varying amplitude in which the envelope during a field scan period decreases from a maximum value in a more or less linear manner to zero in the middle of this period whereafter a substantially equal increase in the reverse direction follows. In fact, the current supplied by the field frequency deflection current generator undergoes an S-correction so that the said envelope at the commencement and at the end of the field scan period varies less than linearly. In FIG. 4 reference H denotes a line period. Current $i_K$ is zero every time at the commencement, in the middle and at the end of each line period.

U.S. Pat. No. 3,440,483 shows that under these circumstances a magnetic quadripolar field is generated so that the three beams $2_R$, $2_G$ and $2_B$ are displaced at the area of this field as is shown in FIG. 5*a*. FIG. 5*b* shows on a larger scale the part of screen 3 in the vicinity of landing spots $4_R$, $4_G$ and $4_B$. These spots undergo a displacement in the same direction as is shown in FIG. 5*a* and occupy the positions $4'_R$, $4'_G$ and $4'_B$. FIG. 5*b* shows that the remaining deviation between these points has become very small. Since the error to be corrected is zero along sides 13′ and 13″ and along axis 11, a line-frequency sinusoidal shape for correction current $i_K$ is suitable. Since the error along axis 12 is zero and is at a maximum at the upper and lower edges a linear envelope of correction current $i_K$ as shown in FIG. 4 is likewise suitable. In this case it has been assumed that the line flyback period is short relative to line period H.

Furthermore the invention is based on the recognition of the fact to form current source 15, which generates current $i_K$, as a part of the North-South correction circuit 10″. This is shown by broken lines in FIG. 3. This circuit generates a substantially parabolic current of line frequency which is amplitude-modulated in an analogous manner as current $i_K$ of FIG. 4. According to this aspect it is then only necessary to change the parabola shape of the field correction current into a sinusoidal shape serving for the convergence correction. This can be carried out in a very simple way when, as is often the case in practice, the parabola shape is approximated by a cosine shape, for example, by making use of a 90° phase-shifting network.

As is known the quadripolar field may alternatively be generated by the deflection coil halves 6′ and 6″. Since North-South correction circuit 10″ is arranged in series with coil halves 6′ and 6″ a simpler embodiment is possible starting from the above mentioned aspect. This is shown in FIG. 6. In this Figure a voltage source 16 forming part of the field time base 9 supplies a field deflection current $i_V$ to coil halves 6′ and 6″ through a transformer 17. A source 18 forming part of correction circuit 10″ and having an internal impedance of which 18′ is the reactive part provides the North-South correction current $i_N$ to the same coil halves via a transformer 19 the secondary winding 19″ of which is arranged in series with these halves so that the same current $i_V + i_N$ passes through them.

One of the ends of the secondary winding 17′ of transformer 17 is connected to earth. A series network 20, 21 tuned to the line frequency is connected in parallel with winding 17′. A capacitor 22 whose capacitance has such a value that the elements 6′, 6″, 18′, 19 and 22 form a circuit which is substantially tuned to the line frequency is connected in parallel with winding 19″. Network 20, 21 constitutes a short circuit for the line frequency while the impedance of circuit 19″, 22 for the field frequency is much lower than that for coil halves 6′ and 6″ (at least during the field scan period). Generators 9 and 10″ cannot therefore substantially influence each other. Due to the symmetry of the circuit a virtual earth point is brought about in the middle M of winding 19′. To attenuate possible parasitic oscillations point M is often actually connected to earth through an isolation capacitor and a resistor.

When source 18 generates a sinusoidal voltage of line frequency modulated by the field frequency, the North-South correction current $i_N$ is cosine-shaped, because the load on circuit 19″, 22 is substantially purely inductive. As is shown in FIG. 7*a* current $i_N$ is at a maximum in the middle of the line period H and during the line scan period L it is an approximation of the required parabolic current. When the above-mentioned series arrangement of an isolation capacitor 23 (for example, 100 nF) and a resistor 24 (for example, 1 to 2 k.ohm) is not connected to point M but to junction Q of circuit 19′, 22 and coil half 6″, a voltage which has the same shape as that of source 18 is produced across said resistor, i.e. a sinusoidal voltage, while the said parasitic oscillations remain attenuated. An additional current $i'_K$ (see FIG. 7*b*) which is sinusoidal is therefore impressed on both coil half 6′ and to coil half 6″, which current flows in one coil half in a direction opposite to that of the currents $i_V$ and $i_N$ and in the other coil half in the same direction as currents $i_V$ and $i_N$ and has approximately the same variation as current $i_K$ of FIG. 4. Current $i'_K$ is the desired difference current and generates the required quadripolar field.

The foregoing only applies when the voltage across resistor 24 originates from a source which may be considered as a current source, that is to say, when the resistance of resistor 24 is large relative to the impedance for the line frequency of the inductances through which current $i'_K$ flows. Otherwise current $i'_K$ would have a cosine-shaped component and would therefore not be zero in the middle of the line scan period. In a practical embodiment of FIG. 6 the inductance of the antiparallel-arranged coil halves 6′ and 6″ was approximately 3.6 mH which is an impedance of approximately 360 ohms for the line frequency. Antiparallel is understood to mean that the inductance of the system 6′, 6″ is measured from point Q in case of a short-circuited circuit 19″, 22. The resistance of resistor 24 was therefore approximately 3 to 5.5 times larger. A still better result is achieved by giving to isolation capacitor 23 the capacitance at which capacitor 23 together with the total inductance of the circuit arrangement of FIG. 6 constitutes a circuit having a resonance frequency which is the line frequency. In this example this capacitance is approximately 28 nF. The said inductance and capacitor 23 constitute a series network whose impedance for the line frequency is very low and is therefore much lower than the resistance of resistor 24. This simple step has the advantage that capacitor 23 has a smaller size and is cheaper. It is thus found that the step according to the invention does not require any extra component and makes an existing component even cheaper.

Resistor 24 may advantageously be formed as an adjustable resistor so that the correction can be brought to the desired value. It is alternatively possible to connect resistor 24 in parallel with coil half 6'' or part thereof with the same effect as described above. Alternatively the correction may be adjusted by arranging the network 23, 24 between a tap on winding 19'' and earth but not between point M and earth because there is no line frequency potential difference between them. It may be noted that the polarity of the correction obtained is reversed when a change-over is made from a given tap to another tap which is symmetrical relative to point M.

In practice all networks of FIG. 6 tuned to the line frequency, with the exception of network 20, 21, are not tuned to the line frequency but to a lower frequency, for example, 12.5 kHz so that the parabolic shape of FIG. 7*a* is better approximated. The line frequency is in fact 15,625 Hz for 625 lines per raster. A condition therefore is that the obtained waveform is shifted in phase, for example by means of an inductor, in order that the maximum value of current $i_N$ is reached in the middle of period L. In FIG. 8*a* curve *f* shows the substantially sinusoidal convergence error indicated in FIG. 2, which error is zero at the commencement, in the middle and at the end of a line scan period L while curve *k* shows the correction provided by the step according to the invention. The frequency thereof is lower so that curve *k* intersects the zero axis only in the middle of period L. Curve *r* shows the obtained resultant residual error. FIG. 8*b* shows the same curves with a smaller amplitude for curve *k*. These Figures show that the points P and P' in which the remaining deviation is zero can be shifted by means of this amplitude and therefore by means of the adjusting value of resistor 24. A compromise can be found between the position of points P and P' and the largest deviation still remaining. A deviation is also present when all networks of FIG. 6 are tuned to the line frequency. In this case curve *k* of FIGS. 8*a* and 8*b* will not intersect the zero axis at the same points as curve *f*.

FIG. 9 shows an aspect in which the mentioned deviation can still more be reduced so that there is substantially no convergence error of the kind shown in FIG. 2. As a result it can be achieved that deflection coils which would otherwise be rejected because the convergence error is too large yet are suitable.

The North-South correction circuit 10'' is often formed in such a manner that the series arrangement of a capacitor 22 and an LC parallel network 30, 31' is arranged in parallel with winding 19'', the inductor 31' in the said parallel network being adjusted in such a manner that the entire circuit of FIG. 9 has one parallel resonance on the line frequency and one on the double value thereof. Capacitor 22 of FIG. 9 has a slightly lower capacitance than that in FIG. 6. In a practical embodiment the capacitance of capacitor 22 is approximately 47 nF, that of capacitor 30 is approximately 390 nF and the inductance of coil 31' is approximately 65 μH. For the line frequency network 39, 31' represents a very low inductance so that the adjustment of coil 31' does not have substantially any disturbing influence thereon. A voltage which is the sum of two sinusoidal voltages, one of the line frequency and one of the double line frequency, is present across winding 19'' so that the North-South correction current $i_N$ is the sum of two cosine-shaped currents having the mentioned frequencies. The path through which this current flows is namely substantially purely inductive. As is known a better approximation of the required parabola shape in FIG. 7*a* is obtained thereby. If necessary, time base 9 may also be decoupled for the double line frequency.

When the series arrangement of capacitor 23 and resistor 24 is connected to point Q through winding 31'' coupled, for example, magnetically to coil 31', a voltage which is the sum of two voltages, to wit a voltage of line frequency and a voltage of double line frequency is produced across said resistor.

FIG. 10 shows the shape for a line period H of the generated correction current. In FIG. 10*a* the fundamental waveform $k_1$ thereof, which corresponds to curve *k* of FIG. 8*a*, is shown. It is found that wave $k_1$, unlike the error *f* to be corrected is not zero at the commencement and at the end of the line scan period L so that a residual error will still remain. FIG. 10*b* shows the wave $k_2$ of the double line frequency and FIG. 10*c* shows the wave $k_3$ which is the sum of waves $k_2$ and $k_1$. It is found that the ratio between the waves $k_1$ and $k_2$ can be chosen to be such that wave $k_3$ is zero, as desired, at the commencement and at the end of the period L so that the convergence error is further reduced.

When the winding sense of windings 31' and 31'' is such that wave $k_2$ has the phase shown in FIG. 10*b*, the obtained correction $h_3$ on either side of the middle of period L will be larger than the correction $h_1$ which is only obtained by wave $k_1$, while correction $h_3$ just after the commencement and just before the end of the period L is smaller than correction $h_1$. Wave $k_2$ therefore has the desired polarity relative to wave $k_1$. It may be noted that the voltage across network 30, 31' also has the desired polarity so that network 23, 24 may be connected to the junction of network 30, 31' and capacitor 22 or to a tap on winding 31'. However, this voltage does not necessarily have the desired amplitude so that a transformer coupling gives an additional degree of freedom.

An advantage of this step is that correction $h_3$ can be made equal to correction $h_1$ by giving resistor 24 a higher value so that this resistor behaves even better as a current source, while source 18 is still less loaded. The adjustment of resistor 24 only influences the amplitude of the correction current and not its shape, which shape is determined by the ratio between waves $k_1$ and $k_2$ that is to say, by the transformation ratio between windings 31' and 31'' which may be fixed for a given display apparatus.

It may be noted that network 30, 31', 31'' is used for two purposes without a compromise between them being necessary and without separate adjustment being necessary. Likewise as in FIG. 6 the series arrangement of resistor 24 and winding 31'' in FIG. 9 may be connected in parallel with coil half 6'' or part thereof. Also the correction may be adjusted by arranging the network 31'', 23, 24 between a tap on winding 19' and earth but not between point M and earth.

Source 18 of FIGS. 6 and 9, likewise as source 15 of FIG. 3 is any known source in a North-South correction circuit. Active circuits are known for this purpose which consist of, for example, an amplifier having a class B transistor output stage. Passive circuits are also known for this purpose. FIG. 11 shows part of such a circuit in which a transducer 26 is used whose two primary windings 26' and 26'' receive line frequency pulses of opposite polarity while a secondary winding 26''' thereof is connected in series with coil halves 6' and 6''. The North-South correction may be adjusted in balance and in phase and amplitude with the aid of a variable magnet 27, an adjustable inductor 28 and an adjustable resistor 29. Due to the selective character of elements 28, 22, 30 and 31' the two required sinusoidal voltages of the field-frequency amplitude variation are produced across winding 26'''. The correction network 31'', 23, 24 may be arranged between a point of the series arrangement of winding 26''' and coil 28 and earth. It is to be noted that the central point M' of the winding may also be chosen because this point is not a virtual earth point due to the presence of inductor 28, which is in contrast with point M of FIGS. 6 and 9. In fact, the virtual earth point is a point M of winding 26''', which is located in FIG. 11 above point M'.

In the given embodiments the field deflection coil halves were arranged in series so that both the field deflection current generator and the North-South correction circuit had to be incorporated in the formed series circuit while correction network 31'', 23, 24 had to be arranged outside this circuit. In FIG. 12, which corresponds to FIG. 6, deflection current generator 16 supplies field deflection current $i_V$ to the parallel-arranged coil halves 6' and 6'' possibly through a symmetry transformer. Source 18, which may be a transducer, supplies current $i_N$ to coil halves 6' and 6'' through the central tap on the secondary winding 19'' of transformer 19 which then functions as a symmetry transformer. Winding 19'' is arranged in series with coil halves 6' and 6''. Series network 20, 21 which is tuned to the line frequency is connected in parallel with source 16 while capacitor 22 is connected in parallel with source 18. The series arrangement of capacitor 23 and resistor 24 is then connected to one end of the primary winding 19' of transformer 19 while the other end of winding 19' is connected to the non-earthed terminal of source 18.

In FIG. 13, which corresponds to FIG. 9, capacitor 22 and the series arrangement of capacitor 30 and coil 31 are connected in parallel with source 18, while capacitor 22 must have a slightly lower capacitance than that in FIG. 12. The end of primary winding 19' remote from network 23, 24 is then not connected to source 18, but to a tap on coil 31 which is to be chosen in such a manner that the correction current has the desired amplitude. A magnetic coupling with coil 31 is of course also possible.

Since the transformer 19 is a symmetry transformer and since resistor 24 may be adjustable, the transformation ratio between windings 19' and 19'' can be freely chosen. For example, the ratio 1 : 2 may be chosen. In this case one winding may be economized and the modification according to FIG. 14 is obtained in which network 23, 24 is arranged between the junction of coil half 6' and winding 19'' and the tap on coil 31. It may be noted that the junction of source 16 and coil halves 6' and 6'' is connected to earth by network 20, 21 with respect to the line frequency so that the end of resistor 24 connected to earth in FIGS. 12 and 13 and the end of capacitor 30 connected to earth in FIG. 14 may also be connected to the said junction.

It has been stated in the foregoing that the field frequency envelope of the convergence correction current varies less than linearly, because the field deflection current is "S-corrected". In practice it has, however, been found that the correction obtained may be too large at the commencement and at the end of the field scan period, that is to say, an overcompensation occurs in the upper part and the lower part of the displayed image. The said envelope must therefore undergo a larger S-correction than field deflection current $i_V$. A simple step is possible for this purpose. It is found from the foregoing that the connection network must be, as it were, connected in parallel with a given coil half, for example, coil half 6''. By contrast, the error to be corrected would become larger with the other coil half. The desired effect is obtained if this other coil half, for example, coil half 6' is bridged by a voltage-dependent resistor VDR. As long as current $i_V+i_N$ is low, the voltage drop across coil half 6' is low so that the current $i_{VDR}$ flowing through the VDR is small. The VDR is then to be considered as a negligible attenuation. When current $i_V$ increases in one or the other direction, the said voltage drop is high and current $i_{VDR}$ increases more than linearly because the current-voltage characteristic of the VDR has an exponential variation. Current $i_{VDR}$ therefore has the shape, as a function of time, shown in FIG. 15 in which the field scan period is denoted by V. This current is subtracted from the correction current which flows through coil half 6'. In case of suitable choice of the VDR the desired correction is thus obtained. A capacitor 32 may be arranged in series with the VDR, the total inductance of the circuit and this capacitor constituting a circuit which is tuned to the line frequency. As a result the VDR behaves substantially as a current source. This series arrangement may be provided, irrespective of whether coil halves 6' and 6'' are arranged in parallel or in series for current $i_V+i_N$. This is therefore possible for all embodiments described but has only been shown in FIGS. 6 and 12 for the sake of simplicity.

A drawback of the described circuits in which the correction current is generated by the North-South correction circuit is that the zero transition point of FIG. 4 coincides with that of the North-South correction current. This means that the two corrections are zero for a given horizontal line which may be adjusted, for example, by adjustment of magnet 27 in FIG. 11. It may be desired that the zero transition point of the correction current in FIG. 4 is to be adjusted separately, for example because the North-South distortion is not symmetrical relative to the central horizontal line on screen 3. This may be achieved in a simple manner by passing a line-frequency substantially sinusoidal current of constant but adjustable amplitude through the deflection coil halves, which current in one coil half is added to the deflection current and in the other coil half is subtracted from the deflection current. As a result the correction quadripolar field in one half of the field scan period is enlarged and in the other half it is reduced. By adjusting the amplitude of this current the position of the zero transition point in FIG. 4 is adjusted. This current may flow through the line deflection coil halves or through the field deflection coil halves or both. FIG. 16 shows a possible embodiment. Capacitor 41 for the S-correction is arranged between the central tap on the primary winding of a symmetry transformer 40 and the line deflection current generator in time base 8. A parabola voltage is present across this capacitor. An adjustable coil and the secondary winding of transformer 40 are arranged between the said centrap tap and earth. The current $i_K''$ of constant amplitude flows through deflection coil halves 5' and 5'' in the given direction in which the amplitude is adjustable by means of coil 42. Current $i_K''$ is the integral of the voltage across capacitor 41 and is therefore a third-degree function of time, i.e. substantially a sinusoidal function.

It is to be noted that the correction current in all described examples originates from a current source. A voltage source would also be possible but it will be evident that the corresponding circuit arrangement would be far more complicated.

It may be noted that convergence errors other than those of FIG. 2 are feasible for which the described simple step would not be adequate. In that case network 23, 24 might be replaced by another suitable network comprising, for example, an inductor or a voltage-dependent resistor.

What is claimed is:

1. A circuit for a deflection coil unit having line and field deflection coils, at least one of said coils having two substantially equal coil halves, said circuit comprising line frequency and field frequency deflection current generator means adapted to couple to said line and field coils respectively for applying sawtooth deflection currents having constant peak to peak amplitudes thereto; a convergence circuit means coupled to said deflection generators for the landing spots of the electron beams of a color cathode ray tube; a raster correction circuit means coupled to said deflection generators for correcting geometrical distortions of a displayed image; means for correcting residual convergence errors occurring at areas outside of the axis and the corners of said image comprising said raster correction circuit having a current source means for generating a substantially sinusoidal first correction current of said line frequency having an amplitude varying at said field frequency in accordance with the instantaneous value of said field deflection current; and means for supplying said correction current to one of said coil halves in a direction equal to the deflection current therein and to said remaining coil half in a direction opposite to the deflection current therein.

2. A circuit as claimed in claim 1 wherein said raster corrĕction circuit further comprises a means for generating a substantially sinusoidal second correction current of twice said line frequency and having a field frequency varying amplitude in accordance with the instantaneous value of said field deflection current, and means for applying said second correction current to one of said coils halves in a direction equal to the deflection current therein and to the remaining coil half in a direction opposite to the deflection current therein.

3. A circuit as claimed in claim 1 wherein said coil having said halves comprises the field deflection coil and raster correction circuit further comprises a vertical pincushion correction means series coupled to said field deflection coils, said field coils being coupled to ground, thereby defining a position in said vertical pincushion correction circuit having substantially a ground potential, and an impedance network coupled between ground and a position of said vertical pincushion correction circuit deviating from said substantially ground potential position.

4. A circuit as claimed in claim 3 wherein said vertical pincushion correction circuit further comprises means coupled to said impedance network for generating a current having a frequency equal to twice the line frequency.

5. A circuit as claimed in claim 4 wherein said twice line frequency generating means comprises an inductor coupled to said network, and a capacitor coupled to said inductor.

6. A circuit as claimed in claim 3 further comprising a transformer coupled to said vertical pincushion correction circuit and having a secondary winding series coupled to said field deflection coils, said impedance network being coupled to the series circuit formed by said secondary and said field coils.

7. A circuit as claimed in claim 6 further comprising an inductor series coupled to said field deflection coils and said secondary.

8. A circuit as claimed in claim 3 wherein said impedance network comprises a resistor.

9. A circuit as claimed in claim 3 wherein said impedance network comprises an inductor, and a capacitor series coupled to said inductor, said capacitor resonanting with said deflection coils and the elements coupled thereto at a frequency at most equal to said line frequency.

10. A circuit as claimed in claim 3 wherein said coil having said halves comprises said field deflection coil, and further comprising a series circuit shunting one of said halves and comprising a voltage dependent resistor and a capacitor, said capacitor resonanting with said halves and elements coupled thereto at said line frequency.

11. A circuit as claimed in claim 1 further comprising means coupled to said coil halves for producing a line frequency sinusoidal current flowing in one of said coils in the same direction as said deflection current and in said remaining coil in a direction opposite to the deflection current direction.

12. A circuit as claimed in claim 11 wherein said sinusoidal producing means comprises an S correction capacitor and said coil halves comprise said line deflection coil.

* * * * *

PO-1050
(5/69)

UNITED STATES PATENT OFFICE
CERTIFICATE OF CORRECTION

Patent No. 3,803,444 Dated April 9, 1974

Inventor(s) JAN GERRITSEN ET AL

It is certified that error appears in the above-identified patent and that said Letters Patent are hereby corrected as shown below:

IN THE TITLE PAGE change "Jam" to -- Jan --; change "Leonaidus" to -- Leonardus --;

Signed and sealed this 19th day of November 1974.

(SEAL)
Attest:

McCOY M. GIBSON JR.
Attesting Officer

C. MARSHALL DANN
Commissioner of Patents